Patented June 12, 1951

2,556,459

UNITED STATES PATENT OFFICE 2,556,459

METHOD FOR COPOLYMERIZING STYRENE AND ALPHA METHYL STYRENE

George L. Wesp, Dayton, Ohio, assignor to Monsanto Chemical Company, St. Louis, Mo., a corporation of Delaware No Drawing. Application April 29, 1948,
Serial No. 24,099

4 Claims. (Cl. 260—88.1)

This invention relates to a new and valuable copolymeric composition having unusually desirable physical properties. More specifically the invention relates to a process for preparing the composition in high yields by an industrially practicable polymerization method.

Polystyrene is a well known and useful industrial material. Although its applications are numerous and its use extensive, it has disadvantageous properties which make it unsuitable for many uses, for example where subjected to temperatures in the vicinity of or in excess of the boiling point of water, or where subjected to severe stress or shock. It is also known that the heat resistance of styrene may be improved by copolymerization with homologous styrenes, and particularly alpha-methyl styrene. Such copolymers have heretofore been prepared only by mass polymerization methods, but the products so prepared have been weak and brittle due to the low average molecular weight. Furthermore, the time required for polymerization has been unreasonably long and the yield of polymer impracticably low. Attempted emulsion polymerizations have also been unsuccessful due to the low yields and unsatisfactory tensile strengths.

The primary purpose of this invention is to develop a superior copolymer of styrene and alpha-methyl styrene. A further purpose of this invention is to provide a method of preparing a commercially usable copolymer of the type described by an emulsion polymerization technique. A still further purpose of this invention is to provide a method of preparing copolymers of styrene and alpha-methyl styrene in yields in excess of 95 percent, and superior copolymers having high molecular weights as evidenced by relative viscosities in excess of 3.3 cps. for a 2.0 percent solution of polymer in dioxane at $25 \pm 0.2°$ C.

It has been discovered that copolymers of 30 to 45 percent of alpha-methyl styrene and 55 to 70 percent of styrene may be copolymerized in aqueous emulsion by a specific procedure, hereinafter described, to form copolymers of the desirable high molecular weight and yields in excess of 95 percent. Copolymers of optimum properties are those of 32 to 42 percent alpha-methyl styrene.

The new polymerization method may be conducted by batch process or in a semi-continuous manner by gradually adding the monomers to an aqueous medium maintained under polymerization conditions. The polymerization is conducted with the monomer/water weight ratios in the reactor between 0.1 to 0.5, and with the aqueous medium containing dissolved therein a peroxy catalyst, more of which is added in increments throughout the reaction, and an emulsion stabilizing agent. The period of reaction should be between four and ten hours during which period the temperatures are maintained btween 80 and 100° C.

Suitable emulsifying agents for the practice of this invention are, sodium oleate and potassium stearate, mixtures of water soluble fatty acid salts, such as the common soaps prepared by the saponification of animal and vegetable oils, the "amino soaps," such as triethanol amine and dodecyl methyl amine, salts of rosin acids and mixtures thereof, the water soluble salts of half esters of sulfuric acid and long chain alkyl alcohols, sulfonated hydrocarbons, such as alkyl aryl sulfonates, and any other of the wide variety of wetting agents, which are in general organic compounds containing both hydrophobic and hydrophilic radicals. The quantity of emulsifying agent will depend upon the particular agent selected, the ratio of monomers to be used, and the conditions of polymerization. In general, however, from 0.1 to 5 percent by weight of the monomers may be employed.

The polymerization is catalyzed by means of any water soluble peroxy compound, for example sodium peroxide, hydrogen peroxide, sodium persulfate, sodium perborate, the sodium salts of other peroxy acids, the potassium, ammonium, and other water salts of peroxy acids and any other water soluble compound containing a peroxy radical (—O—O—). Although wide variations in the quantity of peroxide compound is possible, it is desirable that the rate of peroxide addition, whether it is continuous or intermittent, be between 0.01 and 0.05 percent by weight potassium persulfate per hour based on the weight of the total monomers to be polymerized in the reaction. Optimum results are obtained by using from 0.015 to 0.03 percent of potassium persulfate per hour. Corresponding molecular proportions of other peroxides may be used. Thus, from 0.02 to 0.10, and preferable 0.03 to 0.06, gram molecular weights of any of the above water soluble catalysts are added every hour, in any manner, to a reaction for the polymerization of 100 pounds of monomers. Accordingly, only a portion of the catalyst is charged at the beginning of the reaction and the balance added continuously or intermittently in such a manner that the overall rate of catalyst reaction is within the said critical limitations.

Although the polymerization reaction is practicable within the ranges of conditions above described, optimum physical properties and yields are achieved by utilizing water soluble inorganic persulfate catalysts, monomer weight/water weight ratios between 0.3 and 0.5, monomer proportions of 32 to 40 percent alpha-methyl styrene and the balance styrene, and by operating the polymerization at the reflux temperature of the emulsion. The preferred operation involves the use of stabilizing agents of the group consisting of the sodium salts of sulfonate alkyl or aromatic hydrocarbons, rosin soaps, and sodium and potassium fatty acid soaps, buffered to a pH of 7 to 12 by the presence of sodium bicarbonate, sodium phosphate or other similar compounds.

The emulsion polymers prepared in accordance with this invention may be precipitated by the addition of alcohol, or an aqueous solution of alum or other salt, or in general by the addition of any electrolyte. Coagulation of the latices may also be effected by agitation, freezing, or any other conventional method. Since the new method produces good polymers in high yields without the introduction of excessive quantities of foreign matter, the emulsion may be dried directly by evaporation of the aqueous phase, for example by spray drying.

The practice of this invention enables the production of the desired copolymers of styrene and alpha-methyl styrene in yields in excess of 95 percent. The new copolymers are characterized by their high molecular weight as manifested by a relative viscosity in excess of 3.3 cps. as a 2.0 percent solution in dioxane at 25±0.2° C. Such compositions have been estimated to have molecular weights in excess of 40,000. In the preferred practice of this invention yields approaching 100 percent can be obtained, and polymers with relative viscosities in excess of 4.0 thereby produced.

The new method represents a substantial improvement over the mass polymers of styrene and alpha-methylstyrene in physical properties, yields, and speed of reaction. Of numerous mass polymerizations no yields in excess of 90 percent were observed, all of the compositions were weak and brittle, and reaction periods in excess of 200 hours were required to produce even the low and impracticable yields. Emulsion polymerization procedure is not readily adaptable to the styrene-alpha-methylstyrene system, and low yields of low molecular weight polymers are produced unless the above described critical conditions are maintained. In accordance with this invention superior products are obtained in yields in excess of 95 percent.

The relationship between the relative viscosity in 2 percent dioxane solution at 25° C., the tensile and flexural strengths and the proportions of monomers are set forth in the following tabulation of data observed by testing samples made by various polymerization procedures, some of which (marked *) are in accordance with this invention.

| Relative Viscosity | Compression Moldings | | Weight Per Cent of α-methyl-styrene |
|---|---|---|---|
| | Ten. Str. | Flex. Str. | |
| 2.2 | Too brittle to remove from the mold. | | 40 |
| 2.5 | | | 40 |
| 2.6 | | | 40 |
| 2.7 | | | 40 |
| 3.1 | 4,300 | 5,350 | 40 |
| 3.2 | 4,300 | 7,250 | 40 |
| 3.4 | 5,700 | 9,700 | *36 |
| 3.5 | 5,950 | 10,600 | *36 |
| 3.6 | 5,275 | 10,600 | *36 |
| 3.8 | 6,500 | 12,500 | *40 |
| | 6,000 | 11,000 | (1) |

1 Commercial polystyrene.

The tabulation of data demonstrates that the copolymers having relative viscosities less than 3.3 are weaker than polystyrene, whereas those of higher viscosity and higher molecular weight, are substantially equivalent to polystyrene.

The relationships between monomer proportions, tensile and flexural strengths, air bath heat distortion point (A.S.T.M.) and the relative viscosity in 2 percent dioxane solution are set forth in the following tabulation of experiments, all of which were performed by methods in accordance with this invention.

| Weight Per Cent of α-methyl-styrene | Rel. Visc. | Compression Tensile, lbs./sq. in. | Moldings Flexural, lbs./sq. in. | Air Bath Heat Distortion, ° C. |
|---|---|---|---|---|
| 30 | 4.3 | 6,200 | 12,600 | 93.0 |
| 30 | 4.8 | 6,200 | 12,400 | 92.0 |
| 32 | 4.6 | 5,500 | 11,500 | 95.6 |
| 32 | 4.7 | 6,600 | 10,200 | 94.0 |
| 36 | 4.7 | 6,400 | 12,900 | 99.0 |
| 40 | 5.1 | 7,600 | 14,000 | 102.5 |
| (1) | | 6,000 | 11,000 | 82 |

1 Comm. polystyrene.

The data tabulated above indicate the desirability of copolymers of at least 32 percent of alpha-methylstyrene, and shows that copolymers with relative viscosities over 4.0 are superior to polystyrene in strength and heat resistance.

Further details of the practice of this invention are set forth with respect to the following specific examples.

EXAMPLE 1

A 1-liter glass laboratory flask was charged with 40 grams of alpha-methylstyrene, 17.15 grams of styrene, 236 grams of distilled water, and 2.3 grams of a commercial soap (the sodium salt of a mixture of fatty acids with a titre of 39° C.). The mixture was then heated to the reflux temperature in an atmosphere of nitrogen maintained by passing a stream of gaseous nitrogen through the flask, and while vigorously agitating the reaction mass with a mechanical stirrer. A 0.5 percent aqueous solution of potassium persulfate was prepared and approximately 2.09 grams of this solution was added at the start of the reaction and at 30 minute intervals thereafter until a total of 29.26 grams had been added. Additional styrene was added to the reaction periodically in accordance with the following schedule.

| Min. after 1st Catalyst Addition | Grams Styrene |
|---|---|
| 60 | 13.70 |
| 120 | 11.00 |
| 180 | 8.75 |
| 240 | 6.70 |
| 300 | 2.70 |

The reaction mixture was kept at reflux with stirring for a total of seven hours after the first catalyst addition and then submitted to intensive steam distillation, during which 1.7 grams of unreacted hydrocarbon was removed. This corresponds to 98.3 percent conversion of monomer to polymer. The steamed emulsion which had a pH of 7.0 was adjusted to pH 10 with caustic soda and then frozen to cause coagulation. The coagulate was then removed by filtration, washed with water and alcohol and dried in vacuo for twenty hours at 101° C. The colorless product had the following properties.

| Relative Visc. 2% in Dioxane | Compression Moldings | | ASTM D-648-41T Air Bath Heat D. P. |
|---|---|---|---|
| | Tensile Str. | Flexural Str. | |
| 4.4 | P. s. i. 6,700 | P. s. i. 13,600 | ° C. 99.8 |

Injection molded objects retained their shape and usefulness even after immersion in boiling water for several hours. Similar moldings of commercial polystyrene shrank and lost all semblance of their original shape when given the same treatment.

EXAMPLE 2

A similar preparation made with 1.2 percent soap and scaled up to 1200 grams of monomers gave 95.3 percent conversion to polymer which had the following properties after sheeting on a mill and being ground to a particle size suitable for injection molding in production equipment.

Relative viscosity 2% in dioxane at 25° C., cps. _____ 3.9
Heat dist. point °C. A. S. T. M. D-648-41T _____ 98.8
Injection moldings
  Tensile strength, p. s. i. _____ 6,700
  Flexural strength, p. s. i. _____ 15,900
  Elongation, % _____ 2.4
  Deflection in./2 in. _____ 0.085
  Impact notched _____ 0.51
  Power factor 1 Mc _____ 0.00025
  Dielectric const. 1 Mc _____ 2.64

The excellent strength, heat distortion resistance and electrical properties of the product permit its use in electrical and mechanical applications involving exposure to temperatures above 80–85° C., the air bath heat distortion point of commercial polystyrene.

EXAMPLE 3

In a similar preparation made in a 100 gallon glass coated reactor and using 100 pounds of monomer but with the total time at reflux extended to eight hours after the first catalyst addition, and with the soap concentration reduced to 1.08 percent on a monomer basis, a conversion of 96.3 percent of the monomers to polymer was obtained. In this preparation the steamed emulsion was coagulated with alum and washed with dilute caustic, followed by washes with dilute acid and dilute ammonium hydroxide.

| Relative Visc. 2% in Dioxane | Compression Moldings | | ASTM D-648-41T Air Bath Heat Dist. Point |
|---|---|---|---|
| | Tensile Str. | Flexural Str. | |
| Cps. [1] 5.2 ([2]) | P. s. i. 5,500 7,600 | P. s. i. 11,000 14,000 | ° C. 96.0 102.5 |

[1] As prepared above.
[2] After removal of fatty acids and trace impurities by dissolving in benzene and precipitating with alcohol.

The material without purification was found to give injection moldings of excellent strength and light color and the shape and utility of the molded object was unchanged after several hours immersion in boiling water (99.5° C.).

It is not essential to the successful practice of this invention that the monomers be introduced into the polymerization mixture according to the procedure of Example 1. All of the monomers may be introduced at the start or a mixture of the monomers can be added continuously or discontinuously during the course of the polymerization as shown by the following examples.

EXAMPLE 4

The following ingredients were added to a 1-liter round bottom glass flask equipped with a mechanical stirrer and a reflux condenser.

350 grams distilled water
96 grams styrene (64%)
54 grams alpha-methylstyrene (36%)
0.27 grams sodium alkylarylsulfonate
0.15 grams sodium bicarbonate This mixture was brought to reflux temperature with agitation and these conditions were maintained for a total of seven hours during which a total of 51.2 grams 0.5 percent aqueous potassium persulfate was added in aliquots at 30 minute intervals. The unreacted monomers recovered by steam distillation weighed 7.2 grams indicating a conversion to polymer of 95.2 percent.

The product had the following properties after removal of water from the emulsion by evaporation at 85° C. and without the use of any coagulation or purification treatments.

| Relative Visc. 2% in Dioxane | Compression Moldings | | ASTM D-648-41T Heat Distortion Point |
|---|---|---|---|
| | Tensile | Flexural | |
| Cps. 7.0 | P. s. i. 6,900 | P. s. i. 12,600 | ° C. 95.5 |

EXAMPLE 5

The following materials were charged to a 100 gallon glass-lined kettle equipped with an agitator and a reflux condenser.

467 lbs. water
0.2 lbs. sodium alkylarylsulfonate
0.2 lbs. sodium bicarbonate

This mixture was brought to reflux temperature with agitation and the continuous addition of the following monomer charge containing dissolved wetting agent was begun.

128 lbs. styrene
72 lbs. alpha-methylstyrene
0.2 lbs. sodium alkylarylsulfonate

All of the monomer charge was introduced at a constant rate during a five hour time during which the kettle contents were maintained at reflux temperature and agitated. Simultaneously with the start of the monomer charge addition, a solution of 0.36 pound $K_2S_2O_8$ dissolved in 29 pounds of water was added in aliquots at the start of monomer addition and at 30 minute intervals thereafter over a period of 6.5 hours. Seven hours after the start of monomer addition 5 pounds of unreacted hydrocarbon were obtained by steam distillation indicating a conversion of 97.5 percent to polymer was obtained.

The product obtained after drying of the emulsion at 80° C. had the following properties.

| Relative Visc. 2% in Dioxane | Compression Moldings | | ASTM D-648-41T Heat Dist. Pt. |
|---|---|---|---|
| | Tensile Str. | Flexural Str. | |
| Cps. 4.2 | P. s. i. 5,550 | P. s. i. 11,050 | ° C. 94.6 |

In contrast to the high conversions and high molecular weight products obtained in the above examples experiments are described below to show that mass polymerizations of monomer mixtures containing 40 percent alpha-methylstyrene, 60 percent styrene are too slow for economically feasible practice, and that both high conversion and high molecular weight products cannot be obtained in one and the same reaction in a commercially practical length of time.

*Sequence of thermal treatments*

| Ex. | Temperature, ° C. | Hours Treated | Catalyst | Per Cent Conv. | Rel. Visc. 2% in Dioxane |
|---|---|---|---|---|---|
| | | | | | Cps. |
| 6 | 100—130—170 | 48—48—72 | None | 86.2 | 2.41 |
| 7 | 100—130—140 | 48—48—216 | do | 85.4 | 2.44 |
| 8 | 80 | 312 | do | 15.0 | 5.3 |
| 9 | 70—100—125—175 | 96—96—24—24 | 0.2% DTBP [1] | 90.5 | 2.68 |

[1] Ditertiary butyl peroxide.

Although the invention has been described with respect to specific embodiments, it is not intended that the details thereof shall be construed as limitations upon the scope of the invention except to the extent incorporated in the following claims.

I claim:

1. A method of preparing copolymers of styrene which comprises reacting from 30 to 45 percent by weight of alpha-methylstyrene and 55 to 70 percent of styrene in an aqueous emulsion in which the ratio of monomer weight to water weight is maintained between 0.1 and 0.5 and in the presence of from 0.1 to 5 percent by weight of the total monomers of an emulsion stabilizer, maintaining the temperature between 80° C. and 110° C., throughout the reaction period of four to 12 hours, adding from 0.02 to 0.10 gram molecular weights of a water soluble peroxy compound per hour for each 100 pounds of total monomers, and recovering the copolymer.

2. A method of preparing copolymers of styrene and alpha-methylstyrene which comprises reacting from 32 to 42 percent by weight of alpha-methylstyrene and 58 to 68 percent styrene in an aqueous emulsion in which the ratio of monomer weight to water weight is maintained between 0.3 and 0.5, and in the presence of from 0.1 to 5 percent by weight of the total monomer of an emulsion stabilizer, maintaining the temperature between 80 and 110° C. throughout the reaction period of four to 12 hours, adding from 0.03 to 0.06 gram molecular weights of a water soluble peroxy compound per hour for each 100 pounds of total monomers, and recovering the copolymer.

3. A method of preparing copolymers of styrene and alpha-methylstyrene which comprises reacting from 30 to 45 percent by weight of alpha-methylstyrene and 55 to 70 percent of styrene in an aqueous emulsion in which the ratio of monomer weight to water weight is maintained between 0.1 and 0.5, and in the presence of 0.1 to 5 percent by weight of the total monomers of an emulsion stabilizer, maintaining the temperature at approximately the reflux temperature of the reaction mass for a period of four to 12 hours, adding from 0.01 to 0.05 percent by weight of potassium persulfate per hour based on the weight of total monomers, and recovering the copolymer.

4. A method of preparing copolymers of styrene and alpha-methylstyrene which comprises reacting from 32 to 42 percent by weight of alpha-methylstyrene and 58 to 68 percent of styrene in an aqueous emulsion in which the ratio of monomer weight to water weight is maintained between 0.3 and 0.5, and in the presence of 0.1 to 5 percent by weight of the total monomers of an emulsion stabilizer, maintaining the temperature at approximately the reflux temperature of the reaction mass for a period of four to 12 hours, adding from 0.015 to 0.03 percent by weight of potassium persulfate per hour based on the weight of total monomers, and recovering the copolymer.

GEORGE L. WESP.

REFERENCES CITED

The following references are of record in the file of this patent:

UNITED STATES PATENTS

| Number | Name | Date |
|---|---|---|
| 2,198,185 | Stanley | Apr. 23, 1940 |
| 2,302,464 | Palmer | Nov. 17, 1942 |
| 2,310,961 | Kropa | Feb. 16, 1943 |
| 2,383,069 | Marks | Aug. 21, 1945 |
| 2,436,614 | Sparks et al. | Feb. 24, 1948 |

OTHER REFERENCES

Brajnikoff—Plastics (London) July, 1942 (pages 230–238).